US006652631B2

(12) United States Patent
Itakura

(10) Patent No.: US 6,652,631 B2
(45) Date of Patent: Nov. 25, 2003

(54) DAMPENING WATER COMPOSITION FOR LITHOGRAPHIC PRINTING PLATE AND LITHOGRAPHIC PRINTING PROCESS

(75) Inventor: Ryosuke Itakura, Shizuoka-Ken (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 10/255,621

(22) Filed: Sep. 27, 2002

(65) Prior Publication Data

US 2003/0106459 A1 Jun. 12, 2003

(30) Foreign Application Priority Data

Sep. 28, 2001 (JP) ....................................... 2001-299413
Sep. 19, 2002 (JP) ....................................... 2002-272598

(51) Int. Cl.[7] .................................................. C09K 3/18
(52) U.S. Cl. ........................................... 106/2; 101/451
(58) Field of Search ............................... 106/2; 101/451

(56) References Cited

U.S. PATENT DOCUMENTS

| | | | | | |
|---|---|---|---|---|---|
| 5,064,749 | A | * | 11/1991 | Matsumoto et al. | 430/331 |
| 5,221,330 | A | * | 6/1993 | Matsumoto et al. | 106/2 |
| 5,244,495 | A | * | 9/1993 | Doi et al. | 106/2 |
| 5,387,279 | A | * | 2/1995 | Conti et al. | 106/2 |
| 5,637,444 | A | * | 6/1997 | Matsumoto | 430/331 |
| 5,720,800 | A | * | 2/1998 | Matsumoto | 106/2 |
| 6,294,318 | B1 | * | 9/2001 | Matsumoto et al. | 430/331 |
| 6,312,873 | B1 | * | 11/2001 | Matsumoto et al. | 430/309 |
| 2002/0147300 | A1 | * | 10/2002 | Matsumoto | 528/422 |

FOREIGN PATENT DOCUMENTS

| | | |
|---|---|---|
| JP | 2001-105764 | 4/2001 |

* cited by examiner

*Primary Examiner*—Helene Klemanski
(74) *Attorney, Agent, or Firm*—Burns, Doane, Swecker & Mathis, LLP

(57) ABSTRACT

A dampening water composition for a lithographic printing plate including at least one compound represented by formula (I) and at least one compound represented by formula (II):

(I)

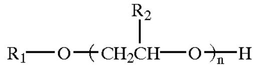

wherein $R^1$ represents an alkyl group having 3 to 6 carbon atoms, $R^2$ represents methyl group or a hydrogen atom, and n is an integer ranging from 1 to 3;

(II)

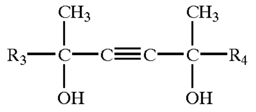

wherein $R^3$ and $R^4$ are each independently methyl group, ethyl group, or isopropyl group; a lithographic printing process for producing printed matters using a soybean oil ink in combination with the above dampening water composition.

12 Claims, No Drawings

DAMPENING WATER COMPOSITION FOR LITHOGRAPHIC PRINTING PLATE AND LITHOGRAPHIC PRINTING PROCESS

FIELD OF THE INVENTION

The present invention relates to a dampening water composition for a lithographic printing plate, and more specifically, to a dampening water composition which is useful for offset printing using a lithographic printing plate. The present invention also relates to a lithographic printing process.

BACKGROUND OF THE INVENTION

The lithographic printing technique makes the best use of the properties of water and oil such that they are essentially incompatible with each other. Two different areas are formed on the printing surface of a lithographic printing plate, one receiving water and repelling oil ink and the other repelling water and accepting the oil ink. The former serves as a non-image area and the latter becomes an image area.

The non-image area is made damp with a dampening water for use in lithographic printing in practice, thereby increasing the difference in surface chemical properties between the image area and the non-image area. Both the ink repellency of the non-image area and the ink receptivity of the image area can be thus increased.

The conventionally known dampening water are aqueous solutions of, for example, alkali metal salts or ammonium salts of bichromic acid, phosphoric acid or salts thereof such as ammonium salt, and a colloidal substance such as gum arabic or carboxymethyl cellulose (CMC). However, it is difficult to uniformly dampen all the non-image areas formed on the lithographic printing plate with the above-mentioned conventional dampening water, and for this reason, the resultant printed matters sometimes get smudged. In addition, a high degree of skill is required to control the amount of dampening water supplied to the printing plate.

To overcome such problems, the Dahlgren dampening system has been introduced, which employs as a dampening water an aqueous solution containing about 20 to 25% of isopropyl alcohol. This method provides some advantages, for example, an improvement in workability and an increase in the accuracy of obtained printed matters. To be more specific, the wettability of the non-image area with the damping water is improved so that the amount of the dampening water to be applied can be reduced. The result is that the balance between the amount of the printing ink and that of the dampening water to be supplied can be easily controlled, and that the amount of water to be emulsified into the printing ink can be lowered, thereby improving the transfer performance of the printing ink to the blanket.

However, isopropyl alcohol used in the Dahlgren dampening system evaporates easily and quickly, and therefore, a special device for keeping the predetermined concentration of isopropyl alcohol in the dampening water is required. This is unfavorable from the viewpoint of cost. Moreover, the Dahlgren dampening system is disadvantageous in terms of working environment because isopropyl alcohol gives out a disagreeable smell and produces a problem of toxicity.

Even if such a dampening water containing isopropyl alcohol is applied to conventional offset printing in which a dampening molleton roller is used, no effect can be obtained because isopropyl alcohol easily evaporates from the roller surface and the printing plate surface.

Moreover, the pollution by industrial waste has recently become a matter of public concern. There is a tendency that the discharge of chromium ions from the conventional dampening water into waste water is severely regulated and the use of organic solvents such as isopropyl alcohol is controlled in light of safety and hygiene.

Accordingly, a dampening water composition containing no isopropyl alcohol or reduced amount of isopropyl alcohol has been desired for the lithographic printing plate. For example, JP KOKOKU Nos. Sho 55-25075, Sho 55-19757 and Sho 58-5797 disclose dampening water compositions comprising a variety of surfactants. However, when such dampening water compositions are used in practice, it is necessary to control the concentration of the surfactant in each dampening water composition to a considerably high level for obtaining the dampening water composition with a surface tension of 35 to 50 dyn/cm. In addition, the above-mentioned dampening water compositions containing a variety of surfactants cannot completely solve the problem that water is attached to an ink layer and ink is dispersed in the surface portion of a water layer, which problem results from vigorous motion of both ink and water under the conditions that the ink roller, printing plate, and dampening water feeding roller are rotated at high speed in the course of lithographic printing. These dampening water compositions have still another shortcoming that foaming is easily caused while the dampening water compositions are pumped up and stirred.

U.S. Pat. Nos. 3,877,377 and 4,278,467 and JP KOKAI No. Sho 57-199693 disclose dampening water compositions comprising some solvents other than isopropyl alcohol. Such dampening water compositions are considered to be advantageous in terms of safety and hygiene in light of the absence of isopropyl alcohol. However, when these dampening water compositions are used together with a lithographic printing plate which comprises an anodized aluminum plate as a substrate, the non-image area is contaminated with ink during printing, which is called "scumming", and the configuration of dot-image becomes abnormal, to be more specific, the dots become larger than a predetermined size and uneven as a whole, which problem is called "fill-in". Moreover, the use of such dampening water compositions free from isopropyl alcohol imposes limitations on the kind of printing press to be used. The isopropyl alcohol free system cannot be achieved in the Dahlgren dampener system and a commercially available dampener system "Alcolor" (trademark), made by Heidelberger Druckmaschinen AG.

JP KOKOKU No. Sho 64-7599 proposes to use a desensitizing solution containing acetylene glycol for the lithographic printing plate. However, such a desensitizing solution cannot exhibit the stable continuous printability for an extended period of time.

In recent years, soybean oil ink that uses soy bean oil as a solvent has been widely introduced into both the sheet-feed press and the rotary offset in consideration of environment protection and conservation of petroleum resources. While linseed oil conventionally used in this field is a drying oil, the soy bean oil is a semi-drying oil, so that the drying properties of the soybean oil ink after printing operation are unsatisfactory. Insufficient drying properties of the soybean oil ink produce the problems of offset and blocking.

Accordingly, a dampening water composition for the lithographic printing plate capable of producing printed matters with high quality has been desired, which dampening water composition is safe from the viewpoint of environmental hygiene, which does not require any technical skill when used in printing operation so that the supply amount of dampening water can be adjusted with no difficulty, and which is applicable to any printing press, and which can exhibit such excellent dampening water properties as to prevent the contamination of the printing plate and cope with high speed printing.

SUMMARY OF THE INVENTION

An object of the present invention is to provide a dampening water composition for the lithographic printing plate capable of producing excellent printed matters, which dampening water composition can replace the isopropyl alcohol based dampening water composition so as to provide a comfortable and safe working environment. Another object of the present invention is to provide a dampening water composition having such a low dynamic surface tension that stable continuous printability can be ensured even under the conditions that the surrounding members are rotated at high speed. A further object of the present invention is to provide a dampening water composition which can exhibit excellent printability in any kinds of printing presses.

Under such circumstances, the inventor of this invention has conducted various studies on a dampening water composition for the lithographic printing plate, and have found that the desired dampening water composition can be accomplished by using a specific glycol ether and a specific acetylene glycol in combination. Namely, by employing the dampening water composition comprising a specific glycol ether and a specific acetylene glycol, the scumming can be effectively prevented without causing deterioration of ink-receptivity, the continuous printability is improved, a water feeding roller used together with the dampening water can be prevented from being contaminated, and excellent printing, setting and drying properties of the employed printing ink can be ensured even if there is employed a printing ink comprising a large amount of vegetable oil or semi-drying oil, such as a soybean oil ink Thus the inventors have completed the present invention.

Consequently, the present invention is directed to a dampening water composition for a lithographic printing plate comprising at least one compound represented by the following formula (I) and at least one compound represented by the following formula (II):

(I)

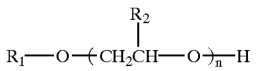

wherein $R^1$ represents an alkyl group having 3 to 6 carbon atoms, $R^2$ represents methyl group or a hydrogen atom, and n represents an integer ranging from 1 to 3;

(II)

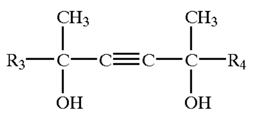

wherein $R^3$ and $R^4$ are each independently methyl group, ethyl group, or isopropyl group.

In a preferable embodiment of the present invention, the compound represented by the above-mentioned formula (I) is selected from the group consisting of propylene glycol mono-n-propyl ether, propylene glycol mono-n-butyl ether, propylene glycol mono-t-butyl ether, and ethylene glycol mono-t-butyl ether.

The present invention is also directed to a lithographic printing process for producing printed matters using a soybean oil ink in combination with a dampening water composition comprising at least one compound represented by the formula (I) and at least one compound represented by the formula (II).

DETAILED DESCRIPTION OF THE INVENTION

The present invention will now be described in more detail. A dampening water composition is generally commercialized as a concentrated product, and such a concentrated product is properly diluted when used in practice. The contents or amounts of the components for use in the dampening water composition described in this specification are expressed on the basis of the total weight of the dampening water composition when used in practice, unless otherwise specified.

In the compound represented by the formula (I), $R^1$ represents an alkyl group, preferably a straight chain or branched alkyl group, having 3 to 6 carbon atoms. Preferable examples of the alkyl group represented by $R^1$ are isopropyl group, n-propyl group, n-butyl group, isobutyl group, and t-butyl group.

Specific examples of the compound represented by the formula (I) are propylene glycol monoisopropyl ether, dipropylene glycol monoisopropyl ether, tripropylene glycol monoisopropyl ether, propylene glycol mono-n-propyl ether, dipropylene glycol mono-n-propyl ether, tripropylene glycol mono-n-propyl ether, propylene glycol mono-n-butyl ether, dipropylene glycol mono-n-butyl ether, tripropylene glycol mono-n-butyl ether, propylene glycol monoisobutyl ether, dipropylene glycol monoisobutyl ether, tripropylene glycol monoisobutyl ether, propylene glycol mono-t-butyl ether, dipropylene glycol mono-t-butyl ether, tripropylene glycol mono-t-butyl ether, ethylene glycol monoisopropyl ether, diethylene glycol monoisopropyl ether, triethylene glycol monoisopropyl ether, ethylene glycol mono-n-propyl ether, diethylene glycol mono-n-propyl ether, triethylene glycol mono-n-propyl ether, ethylene glycol mono-n-butyl ether, diethylene glycol mono-n-butyl ether, triethylene glycol mono-n-butyl ether, ethylene glycol monoisobutyl ether, diethylene glycol monoisobutyl ether, triethylene glycol monoisobutyl ether, ethylene glycol mono-t-butyl ether, diethylene glycol mono-t-butyl ether, and triethylene glycol mono-t-butyl ether.

Among the above-mentioned compounds, propylene glycol mono-n-propyl ether, propylene glycol mono-n-butyl ether, propylene glycol mono-t-butyl ether, and ethylene glycol mono-t-butyl ether are preferably used. The compounds of formula (I) may be used alone or in combination in the dampening water composition of the present invention.

The amount of the compound represented by formula (I) in the dampening water composition suitably ranges from 0.05 to 5.0% by weight, preferably from 0.2 to 3.0% by weight, and more preferably from 0.3 to 1.5% by weight. If the amount of compound having the formula (I) is less than 0.05% by weight, the wetting performance of the printing plate with the dampening water becomes insufficient. On the other hand, when the amount of compound represented by the formula (I) is more than 5.0% by weight, the problem of roller stripping or poor plate wear of the printing plate will be easily caused.

In the compound represented by the formula (II), $R^3$ and $R^4$ are each independently methyl group, ethyl group, or isopropyl group.

The compounds of formula (II) may be used alone or in combination.

The amount of the compound represented by the formula (II) in the dampening water composition suitably ranges from 0.01 to 3.0% by weight, preferably from 0.02 to 1.5% by weight, and more preferably from 0.05 to 1.0% by weight. When the amount of compound having the formula (II) is less than 0.01% by weight, the effect of promoting the drying properties of the employed printing ink such as a soybean oil ink cannot be expected. When the amount of compound represented by the formula (II) exceeds 3.0% by weight, the problem of scumming will easily occur.

The soybean oil, which is a semi-drying oil as mentioned above, comprises less unsaturated bonds than drying oils such as linseed oil. For this reason, oxidative polymerization proceeds more slowly in the soybean oil ink than in the general printing ink comprising linseed oil as a main component. As a result, the drying rate of the soybean oil ink is generally retarded.

The drying properties of the printing ink are affected not only by the progress of oxidative polymerization in the ink as mentioned above, but also by the amount of dampening water taken in the printing ink.

Then, the inventors of the present invention have intensively examined the relationship between the characteristics of the dampening water and the drying properties of the ink layer formed after printing. It has been discovered that when a dampening water composition contains a relatively large amount of water that is taken in the ink and subjected to emulsification, the drying properties of the printing ink is apt to be slow. When the dampening water composition of the present invention is used, the amount of emulsified water remaining in the ink layer formed by printing operation can be decreased and/or the amount of emulsified water in the ink layer is rendered uniform on the entire surface of printed matter, in other words, heterogeneity on the amount of emulsified water in the ink layer can be decreased on the entire surface of printed matter, which is considered to promote the drying properties of the printing ink.

To be more specific, the dynamic surface tension of the dampening water composition according to the present invention can be remarkably lowered by using the compounds of formulas (I) and (II) in combination. Accordingly, the water layer of the dampening water supplied to the printing press can be made thin, and the printing plate can be uniformly supplied with water in a direction of the surface plane. It is therefore considered that the amount of water emulsified in the ink layer of the image area formed on the printing plate is decreased and regional heterogeneity on said amount of water emulsified in the ink layer on the surface of the plate is decreased.

The emulsified ink is thus transferred to a printing sheet, the water content in said ink being abated and uniformity of the water content being enhanced in a direction of the surface of the transferred ink layer. The result is that the time required to dry the transferred ink layer is the same everywhere. There is no portion where the ink drying rate is slower than any other portions, thereby effectively improving the drying properties of the ink.

Another benefit arising from the dampening water of the present invention is that the compound represented by the formula (II) solidifies and crystallizes out in the course of evaporation of water. More specifically, the compound of formula (II) solidifies to crystallize out in the ink layer during the drying process of the printing ink. It is believed that such changes of the compound of formula (II) in the ink layer will decrease the fluidity of the ink layer. Namely, the compound of formula (II) for use in the dampening water effectively works to improve the drying properties of the ink.

The dampening water composition of the present invention can exhibit the effect of accelerating the ink drying performance, for example, when the printing ink comprising linseed oil as a main component is used. Such an effect becomes particularly noticeable when the dampening water composition of the present invention is applied to a printing process using the soybean oil ink which tends to dry slowly.

In the dampening water composition of the present invention, the amount ratio by weight of the compound of formula (I) to the compound of formula (II) is suitably in the range of (1:1) to (20:1), preferably in the range of (2:1) to (15:1), and more preferably in the range of (3:1) to (10:1). When the amount ratio of the compound of formula (I) to the compound of formula (II) is within the above-mentioned range, the compound of formula (II) can be prevented from precipitating as an insoluble matter in the concentrated dampening water composition as a commercial product even if the product is stored under the circumstances of high temperature or low temperature. Namely, the quality of the dampening water product can be maintained during the storage. Moreover, in order to benefit from the above-mentioned effects of the compound represented by formula (II), it is important not to excessively increase the amount of compound represented by formula (I) with respect to the amount of compound of formula (II). The above-mentioned effects can be fully exhibited when the compound of formula (I) and the compound of formula (II) are used in the above specified amount ratios.

The dampening water composition according to the present invention may further comprise the following additives:

(a) an agent for improving the wetting performance, (b) a water-soluble polymeric compound, (c) a pH-buffering agent, (d) a chelating agent (e) an odor-masking agent, and (f) other additives including (1) an antiseptic agent, (2) a coloring agent, (3) an anti-corrosion agent, and (4) an anti-foaming agent.

As the agent (a) for improving the wetting performance, surfactants and other solvents may be used.

Examples of such surfactants include the following anionic surfactants:

fatty acid salts, abietates, hydroxyalkanesulfonates, alkanesulfonates, dialkylsulfosuccinates, linear alkylbenzenesulfonates, branched alkylbenzenesulfonates, alkylnaphthalenesulfonates, alkylphenoxy polyoxyethylenepropylsulfonates, polyoxyethylene alkylsulfophenyl ether salts, sodium salts of N-methyl-N-oleyltaurine, disodium salts of N-alkylsulfosuccinic monoamide, petroleum sulfonates, sulfated castor oil, sulfated tallow oil, sulfates of fatty acid alkyl ester, alkyl sulfates, polyoxyethylene alkyl ether sulfates, fatty acid monoglyceride sulfates, polyoxyethylene alkylphenyl ether sulfates, polyoxyethylene styrylphenyl ether sulfates, alkyl phosphates, polyoxyethylene alkyl ether phosphates, polyoxyethylene alkylphenyl ether phosphates, partially saponified styrene—maleic anhydride copolymer, partially saponified olefin—maleic anhydride copolymer, and condensates of naphthalenesulfonate and formalin. Among the anionic surfactants which are particularly preferable are dialkylsulfosuccinates, alkyl sulfates and alkylnaphthalenesulfonates.

The following nonionic surfactants can also be used: polyoxyethylene alkyl ethers, polyoxyethylene alkylphenyl ethers, polyoxyethylene polystyrylphenyl ethers, polyoxyethylene polyoxypropylene alkyl ethers, partial esters of glycerin fatty acid, partial esters of sorbitan fatty acid, partial esters of pentaerythritol fatty acid, propylene glycol monofatty acid ester, partial esters of sucrose fatty acid, partial esters of polyoxyethylene sorbitan fatty acid, partial esters of polyoxyethylene sorbitol fatty acid, polyethylene glycol fatty acid esters, partial esters of polyglycerin fatty acid, castor oil modified with polyoxyethylene, partial esters of polyoxyethylene glycerin fatty acid, fatty acid diethanolamides, N,N-bis-2-hydroxyalkylamines, polyoxyethylene alkylamines, triethanolamine fatty acid esters, and trialkylamine oxides. In addition to the above, fluorine-containing surfactants and silicon-containing surfactants can also be employed. Particularly preferred are polyoxyethylene alkylphenyl ethers, polyoxyethylene polyoxypropylene block copolymers.

The amount of the surfactant to be incorporated in the dampening water composition is suitably not more than 1.0% by weight and preferably in the range from 0.001 to 0.5% by weight, with the problem of foaming taken into consideration. The above-mentioned surfactants may be used alone or in combination.

To improve the wetting performance, the following assistants and wetting agents may also be added to the dampening water composition: ethylene glycol monomethyl ether, diethylene glycol monomethyl ether, triethylene glycol monomethyl ether, polyethylene glycol monomethyl ether, ethylene glycol monoethyl ether, diethylene glycol monoethyl ether, triethylene glycol monoethyl ether, propylene glycol monomethyl ether, dipropylene glycol monomethyl ether, tripropylene glycol monomethyl ether, propylene glycol monoethyl ether, dipropylene glycol monoethyl ether, tripropylene glycol monoethyl ether, tetrapropylene glycol monoethyl ether, 3-methoxy-3-methyl butanol, 3-methoxy butanol, ethylene glycol, diethylene glycol, triethylene glycol, butylene glycol, hexylene glycol, glycerin, diglycerin, polyglycerin, trimethylolpropane, propylene glycol, dipropylene glycol, tripropylene glycol, tetrapropylene glycol, and pentapropylene glycol.

These solvents may be used alone or in combination. The amount of these solvents suitably ranges from 0.1 to 3% by weight, and preferably from 0.3 to 2% by weight, on the basis of the total weight of the dampening water composition of the present invention.

Examples of the water-soluble polymeric compound (b) for use in the dampening water composition of the present invention are natural compounds and modified products thereof including gum arabic, starch derivatives such as dextrin, enzyme-modified dextrin, hydroxypropylated enzyme-modified dextrin, carboxymethylated starch, starch phosphate, and octenyl succinated starch, alginates, and cellulose derivatives such as carboxymethyl cellulose, carboxyethyl cellulose, and methyl cellulose; and synthetic compounds such as polyethylene glycol and copolymers thereof, polyvinyl alcohol and derivatives thereof, polyvinyl pyrrolidone, polyacrylamide and copolymers thereof, polyacrylic acid and copolymers thereof, vinyl methyl ether—maleic anhydride copolymer, vinyl acetate—maleic anhydride copolymer, and polymer of styrenesulfonic acid and copolymers thereof.

The amount of the water-soluble polymeric compound (b) for use in the dampening water composition suitably ranges from 0.0001 to 0.1% by weight, and preferably ranges from 0.0005 to 0.05% by weight.

As the pH-buffering agent (c) optionally used in the dampening water composition of the present invention, water-soluble organic and/or inorganic acids or salts thereof can be employed, and such compounds exhibit a pH-controlling or buffering effect, and an effect of properly etching the surface of a substrate for a lithographic printing plate or a corrosion-inhibitory effect. Examples of the preferred organic acids are citric acid, ascorbic acid, malic acid, tartaric acid, lactic acid, acetic acid, gluconic acid, hydroxyacetic acid, oxalic acid, malonic acid, levulinic acid, sulfanilic acid, p-toluenesulfonic acid, phytic acid, and organic phosphonic acid. Examples of the inorganic acids are phosphoric acid, nitric acid, sulfuric acid, and polyphosphoric acid. Further, alkali metal salts, alkaline earth metal salts, ammonium salts and organic amine salts of the above-mentioned organic and/or inorganic acids may also be used. These organic acids, inorganic acids and/or the salts thereof may be used alone or in combination.

It is preferable that the pH-buffering agent be added to the dampening water composition in an amount of 0.001 to 0.3% by weight so that the pH of the resulting dampening water may be within an acidic region ranging from pH 3 to 7. Alternatively, the dampening water composition may also be controlled to fall in an alkaline region of pH 7 to 11 using hydroxides of alkali metals, phosphoric acid, alkali metal salts, carbonates of alkali metals, and silicate as the pH-buffering component.

The dampening water composition of the present invention may further comprise a chelating agent (d) as mentioned above.

The dampening water composition is prepared when used in practice by diluting the concentrated dampening water composition with tap water or well water. Calcium ions and the like contained in the tap water or well water are considered to adversely affect the printing operation and cause the printed matters to be easily smudged. The addition of the chelating agent to the dampening water composition can solve the above-mentioned problem.

Examples of the preferred chelating agent include ethylenediaminetetraacetic acid, and potassium and sodium salts thereof; diethylenetriaminepentaacetic acid, and potassium and sodium salts thereof; triethylenetetraminehexaacetic acid, and potassium and sodium salts thereof; hydroxyethylethylenediaminetriacetic acid, and potassium and sodium salts thereof; nitrilotriacetic acid and sodium salts thereof; and organic phosphonic acids and phosphonoalkanetricarboxylic acids such as 1-hydroxyethane-1,1-diphosphonic acid, and potassium and sodium salts thereof; and aminotri (methylenephosphonic acid), and potassium and sodium salts thereof. The above-mentioned chelating agent may be in the form of not only a potassium salt or a sodium salt, but also an organic amine salt. It is recommended to select a chelating agent that is stable in the dampening water composition diluted for practical use and has no adverse effect on the printing properties.

The amount of the chelating agent in the diluted dampening water composition is suitably in the range of 0.001 to 0.5% by weight, and preferably in the range of 0.002 to 0.25% by weight.

The odor-masking agent (e) includes esters which are conventionally known as aroma chemicals, e.g., compounds represented by the following formula (III):

$$R^5\text{—}COOR^6 \qquad (III)$$

In the aforementioned formula (III), $R^5$ represents an alkyl, alkenyl or aralkyl group having 1 to 15 carbon atoms, or phenyl group. When $R^5$ represents an alkyl group or alkenyl group, it is preferable that the alkyl or alkenyl group have 4 to 8 carbon atoms.

When $R^5$ represents an alkyl, alkenyl or aralkyl group, the group may be a straight chain or branched one. The alkenyl group may have preferably one double bond therein. Examples of the aralkyl group include benzyl group and phenylethyl group. At lease one hydrogen atom in the alkyl, alkenyl or aralkyl group, or phenyl group represented by $R^5$ may be substituted with hydroxyl group or acetyl group.

In formula (III), $R^6$ represents an alkyl or aralkyl group having 3 to 10 carbon atoms, which may be straight chain or branched, or phenyl group. When $R^6$ represents an alkyl group, it is preferable that the alkyl group have 3 to 9 carbon atoms. Examples of the aralkyl group represented by $R^6$ include benzyl group and phenylethyl group.

Specific examples of the odor-masking agent (e) which may be added to the dampening water composition include esters of formic acid, acetic acid, propionic acid, butyric acid, isobutyric acid, 2-ethylbutyric acid, valeric acid, isovaleric acid, 2-methylvaleric acid, hexanoic acid (caproic acid), 4-methylpentanoic acid (isohexanoic acid), 2-hexenoic acid, 4-pentenoic acid, heptanoic acid, 2-methylheptanoic acid, octanoic acid (caplyric acid), nonanoic acid, decanoic acid (capric acid), 2-decenoic acid, lauric acid and myristic acid. In addition to the above, benzyl phenylacetate, and acetoacetic esters such as ethyl acetoacetate and 2-hexyl acetoacetate can be used as the odor-masking agent.

Of such esters, preferred are n-pentyl acetate, isopentyl acetate, n-butyl butyrate, n-pentyl butyrate, and isopentyl butyrate. In particular, n-butyl butyrate, n-pentyl butyrate and isopentyl butyrate are preferably used.

The amount of the odor-masking agent is suitably in the range from 0.0001 to 10% by weight, and preferably from 0.001 to 1% by weight of the total weight of the dampening water of the present invention. The use of the odor-masking agent can make the working environment more comfortable. In this sense, the use of vanillin or ethyl vanillin together with the above-mentioned esters is effective.

Examples of the above-mentioned antiseptic agent (f)-(1) optionally added to the dampening water composition of the present invention include phenol or derivatives thereof, formalin, imidazole derivatives, sodium dehydroacetate, 4-isothiazolin-3-one derivatives, benzotriazole derivatives, amidine or guanidine derivatives, quaternary ammonium salts, pyridine or quinoline derivatives, diazine or triazole derivatives, oxazole or oxazine derivatives, and bromonitroalcohols such as bromonitro propanol, 2,2-dibromo-2-nitroethanol, and 3-bromo-3-nitropentane-2,4-diol.

The antiseptic agent may be added in such an amount that the antiseptic agent can exert its effects against bacteria, mold, yeast and the like. The amount of the antiseptic agent, which varies depending on the kinds of bacteria, mold, yeast and the like to be controlled, preferably ranges from 0.001 to 1.0% by weight on the basis of the total weight of the dampening water composition. In this respect, it is preferable to use two or more antiseptic agents in combination so that the composition is effective against various kinds of mold, bacteria and yeast.

To the dampening water composition according to the present invention, food dyes are preferably used as the coloring agent (f)-(2). For example, there are yellow dyes such as C.I. 19,140 and C.I. 15,985; red dyes such as C.I. 16,185, C.I. 45,430, C.I. 16,255, C.I. 45,380 and C.I.

45,100; purple dyes such as C.I. 42,640; blue dyes such as C.I. 42,090 and C.I. 73,015; and green dyes such as C.I. 42,095.

Examples of the anti-corrosion agent (f)-(3) optionally used in the dampening water composition of the present invention include benzotriazole, 5-methylbenzotriazole, thiosalicylic acid, and benzimidazole and derivatives thereof.

A silicone type antifoaming agent is preferably used as the antifoaming agent (f)-(4) which may be used in the dampening water composition of the present invention. The silicone type antifoaming agent may be in the form of either an emulsion dispersion or solubilized solution.

The dampening water composition of the present invention can provide excellent printing properties and effectively work without any presence of isopropyl alcohol. According to the conditions, the dampening water composition of the present invention may further comprise isopropyl alcohol, provided that the amount of isopropyl alcohol is preferably controlled to 5% or less by weight of the total weight of the dampening water composition so as to benefit from the effects of the present invention.

The remainder of the dampening water composition according to the present invention is water.

Generally, the dampening water composition is commercialized as a concentrated product. Accordingly, the above-mentioned components are dissolved in water, preferably demineralized water, i.e., pure water to obtain an aqueous solution as the concentrated dampening water composition. The concentrated dampening water composition is usually diluted about 10 to 200 times with tap water or well water prior to the practical use, and the dampening water composition for practical use can be obtained.

In the lithographic printing process according to the present invention, the soybean oil ink used may be generally the ones which satisfy the standards for soy-seal qualification according to American Soybean Association, including a heat-set ink for a web rotary offset press comprising 7% or more soybean oil, an ink for a sheet-fed press comprising 20% or more soybean oil, a non-heat ink for a web rotary offset press comprising 30% or more soybean oil, and an ink for a newspaper press comprising 30% or more soybean oil. Specific examples of the soybean oil ink are TK HYECOO SOY and WD LEOECOO SOY manufactured by Toyo Ink Co., Ltd., CERVO SOY manufactured by Tokyo Ink Co., Ltd., DIATONE ECOPURE SOY and WEBMASTER ECOPURE MEGA manufactured by Sakata Inks Co. Ltd., SUPER VITAL ME-SOYA and PERFECT SOYA manufactured by T&K TOKA, and the like. The soybean oil ink used in the present invention is not limited to the specific ones.

The dampening water composition of the present invention will hereunder be explained in more detail with reference to the following non-limitative working examples and comparative examples. In the following Examples and Comparative Examples, the term "%" means "% by weight", unless otherwise specified.

EXAMPLES 1 TO 8 AND COMPARATIVE EXAMPLES 1 TO 8

According to the formulations shown in Table 1 and Table 2, dampening water compositions were prepared. The amount of each component is expressed by unit of % by weight. In Table 1 and Table 2, the amount left after adding the amounts of the components is that of tap water.

Compounds I-(a) to I-(d), compounds II-(a) to II-(d), and comparative compound (e) shown in Table 1 and Table 2 are as follows:

[Compounds Represented by Formula (I)]

I-(a): propylene glycol mono-n-propyl ether

I-(b): propylene glycol mono-n-butyl ether

I-(c): propylene glycol mono-t-butyl ether

I-(d): ethylene glycol mono-t-butyl ether

[Compounds Represented by Formula (II)]

II-(a): $R^3$ and $R^4$ are both methyl group in the formula (II).

II-(b): $R^3$ and $R^4$ are both ethyl group in the formula (II).

II-(c): $R^3$ and $R^4$ are both isopropyl group in the formula (II).

II-(d): $R^3$ is methyl group, and $R^4$ is isopropyl group in the formula (II).

[Comparative Compound (e)]

2,4,7,9-tetramethyl-5-decyne-4,7-diol with the following formula:

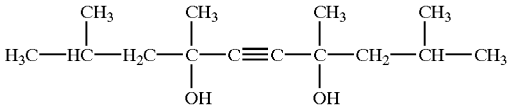

TABLE 1

| Components | | Examples 1 | 2 | 3 | 4 | 5 | 6 | 7 | 8 |
|---|---|---|---|---|---|---|---|---|---|
| Compound of | I-(a) | 1.0 | — | 0.5 | — | 0.5 | — | — | — |
| formula (I) | I-(b) | — | 1.0 | — | 0.5 | 0.5 | — | — | — |
| | I-(c) | — | — | 0.5 | — | — | — | 1.0 | — |
| | I-(d) | — | — | — | 0.5 | — | 1.0 | — | 0.3 |
| Compound of | II-(a) | 0.5 | — | — | — | 1.0 | 0.5 | 0.5 | — |
| formula (II) | II-(b) | — | 0.5 | — | — | — | 0.5 | — | 1.0 |
| | II-(c) | — | — | 0.5 | — | — | — | — | — |
| | II-(d) | — | — | — | 0.5 | — | — | 0.5 | — |
| Propylene glycol | | 0.5 | 0.5 | 0.5 | 0.5 | 0.5 | 0.5 | 0.5 | 0.5 |
| Diethylene glycol | | 0.5 | 0.5 | 0.5 | 0.5 | 0.5 | 0.5 | 0.5 | 0.5 |
| Glycerin | | 0.1 | 0.1 | 0.1 | 0.1 | 0.1 | 0.1 | 0.1 | 0.1 |
| Carboxymethyl cellulose | | 0.01 | 0.01 | 0.01 | 0.01 | 0.01 | 0.01 | 0.01 | 0.01 |
| Ammonium primary phosphate | | 0.01 | 0.01 | 0.01 | 0.01 | 0.01 | 0.01 | 0.01 | 0.01 |
| Ammonium nitrate | | 0.02 | 0.02 | 0.02 | 0.02 | 0.02 | 0.02 | 0.02 | 0.02 |
| Ammonium secondary citrate | | 0.01 | 0.01 | 0.01 | 0.01 | 0.01 | 0.01 | 0.01 | 0.01 |
| Sodium acetate | | 0.01 | 0.01 | 0.01 | 0.01 | 0.01 | 0.01 | 0.01 | 0.01 |
| 2,3-dibromo-2-nitroethanol | | 0.002 | 0.002 | 0.002 | 0.002 | 0.002 | 0.002 | 0.002 | 0.002 |
| 2-methyl-5-chloro-4-isothiazolin-3-one | | 0.002 | 0.002 | 0.002 | 0.002 | 0.002 | 0.002 | 0.002 | 0.002 |
| Tap water | | balance | Balance | Balance | balance | balance | balance | balance | balance |

TABLE 2

| Components | | Comparative Examples 1 | 2 | 3 | 4 | 5 | 6 | 7 | 8 |
|---|---|---|---|---|---|---|---|---|---|
| Compound of | I-(b) | 1.0 | — | — | — | — | — | 1.0 | — |
| formula (I) | I-(d) | — | 1.0 | — | — | — | — | — | — |
| Propylene glycol monomethyl ether | | — | — | 1.0 | — | — | — | — | 1.0 |
| Propylene glycol monoethyl ether | | — | — | — | 1.0 | — | 1.0 | — | — |
| Isopropyl alcohol | | — | — | — | — | 1.0 | — | — | — |
| Compound of | II-(a) | — | — | 0.5 | — | — | — | — | — |
| formula (II) | II-(b) | — | — | — | 0.5 | — | — | — | — |
| | II-(c) | — | — | — | — | 0.5 | — | — | — |
| | II-(d) | — | — | — | — | — | 0.5 | — | — |
| Comparative compound (e) | | — | — | — | — | — | — | 0.5 | — |
| Propylene glycol | | 0.5 | 0.5 | 0.5 | 0.5 | 0.5 | 0.5 | 0.5 | 0.5 |
| Diethylene glycol | | 0.5 | 0.5 | 0.5 | 0.5 | 0.5 | 0.5 | 0.5 | 0.5 |
| Glycerin | | 0.1 | 0.1 | 0.1 | 0.1 | 0.1 | 0.1 | 0.1 | 0.1 |
| Carboxymethyl cellulose | | 0.01 | 0.01 | 0.01 | 0.01 | 0.01 | 0.01 | 0.01 | 0.01 |
| Ammonium primary phosphate | | 0.01 | 0.01 | 0.01 | 0.01 | 0.01 | 0.01 | 0.01 | 0.01 |
| Ammonium nitrate | | 0.02 | 0.02 | 0.02 | 0.02 | 0.02 | 0.02 | 0.02 | 0.02 |
| Ammonium secondary citrate | | 0.01 | 0.01 | 0.01 | 0.01 | 0.01 | 0.01 | 0.01 | 0.01 |
| Sodium acetate | | 0.01 | 0.01 | 0.01 | 0.01 | 0.01 | 0.01 | 0.01 | 0.01 |
| 2,3-dibromo-2-nitroethanol | | 0.002 | 0.002 | 0.002 | 0.002 | 0.002 | 0.002 | 0.002 | 0.002 |
| 2-methyl-5-chloro-4-isothiazolin-3-one | | 0.002 | 0.002 | 0.002 | 0.002 | 0.002 | 0.002 | 0.002 | 0.002 |
| Tap water | | balance | Balance | Balance | balance | balance | balance | balance | balance |

With each of the dampening water compositions above prepared in Examples 1 to 8 and Comparative Examples 1 to 8 being set in a commercially available printing press "Heidelberg Alcolor System" (trademark), made by Heidelberger Druckmaschinen AG, the following printing tests were conducted using a cyan color ink "Hyecoo SOY MZ" (trademark), manufactured by Toyo Ink Co., Ltd., and a printing plate made up from VS (Fuji Photo Film Co., Ltd.) under the standard conditions.

The results obtained are summarized in Table 3 and Table 4.

(a) Continuous Printability and Stability of Water Feeding Roller

Continuous printing was carried out for six consecutive days by producing 10,000 to 30,000 prints per day.

(Continuous Printability)

The continuous printability was evaluated by observing the change in the amount of water supplied into the printing press indicated by a water supply scale (from 1 to 100), which scale is also a measure of rotational frequency of a water feeding roller. The difference between the initial mark of the water supply scale and the mark after completion of the continuous printing was obtained.

○ . . . The continuous printability was evaluated as good because the difference in water supply scale was within less than 5 marks.

Δ . . . The continuous printability was evaluated as slightly poor because the difference in water supply scale was in the range from 5 to 10 marks.

X . . . The continuous printability was evaluated as very poor because the difference in water supply scale was more than 10 marks.

(Stability of Water Feeding Roller)

The stability of the water feeding roller was evaluated by visually observing the degree of contamination on the surface of the water feeding roller. The water feeding roller was subjected to cleaning with isopropyl alcohol after the completion of continuous printing every day.

○ . . . The stability of the water feeding roller was evaluated as good because contamination was hardly observed.

Δ . . . The stability of the water feeding roller was evaluated as slightly poor because contamination was slightly observed.

X . . . The stability of the water feeding roller was evaluated as very poor because contamination was noticeable.

(b) Drying Properties of Soybean Oil Ink

The drying performance of the soybean oil ink "Hyecoo SOY MZ" (trademark) was examined after completion of printing. Specifically, it was evaluated by searching the time required until offset is not observed when two sheets of printed matter are rubbed with each other.

○ . . . The ink dried within a half day after completion of printing.

Δ . . . The ink dried within a day after completion of printing.

X . . . The ink did not dry in a day after completion of printing.

(c) Bleeding of Ink

After making of 5,000 and 10,000 prints, the operation of printing press was stopped, and the obtained images were visually observed in terms of bleeding of ink from an image area to a non-image.

○ . . . Bleeding was hardly observed.

Δ . . . Bleeding was slightly observed.

X . . . Bleeding was noticeable.

TABLE 3

| | | Examples | | | | | | | |
|---|---|---|---|---|---|---|---|---|---|
| | | 1 | 2 | 3 | 4 | 5 | 6 | 7 | 8 |
| Continuous printability | 1st day | ○ | ○ | ○ | ○ | ○ | ○ | ○ | ○ |
| | 3rd day | ○ | ○ | ○ | ○ | ○ | ○ | ○ | ○ |
| | 6th day | ○ | ○ | ○ | ○ | ○ | ○ | ○ | ○ |
| Stability of water feeding roller | 1st day | ○ | ○ | ○ | ○ | ○ | ○ | ○ | ○ |
| | 3rd day | ○ | ○ | ○ | ○ | ○ | ○ | ○ | ○ |
| | 6th day | ○ | ○ | ○ | ○ | ○ | ○ | ○ | ○ |
| Drying properties of soybean oil ink | | ○ | ○ | ○ | ○ | ○ | ○ | ○ | ○ |
| Bleeding of ink | | ○ | ○ | ○ | ○ | ○ | ○ | ○ | ○ |

TABLE 4

| | | Comparative Examples | | | | | | | |
|---|---|---|---|---|---|---|---|---|---|
| | | 1 | 2 | 3 | 4 | 5 | 6 | 7 | 8 |
| Continuous printability | 1st day | ○ | ○ | ○ | ○ | ○ | ○ | ○ | Δ |
| | 3rd day | ○ | ○ | Δ | ○ | ○ | ○ | ○ | X |
| | 6th day | ○ | ○ | X | Δ | Δ | Δ | ○ | X |
| Stability of water feeding roller | 1st day | ○ | ○ | Δ | ○ | ○ | ○ | Δ | X |
| | 3rd day | ○ | ○ | X | Δ | Δ | Δ | X | X |
| | 6th day | ○ | ○ | X | X | X | X | X | X |
| Drying properties of soybean oil ink | | X | X | ○ | ○ | Δ | ○ | X | X |
| Bleeding of ink | | ○ | ○ | X | Δ | ○ | Δ | ○ | X |

The dampening water composition of the present invention can prevent the accumulation of bivalent metal ions deposited on the chromium roller and rubber roller which are incorporated in the dampening arrangement of a continuous feed type, so that a uniform water layer constituted by the dampening water composition can be formed on the lithographic printing plate. Further, the use of the dampening water composition of the present invention can provide a comfortable and safe working environment. The dynamic surface tension of the dampening water composition is so low that excellent and stable printability can be ensured even though the dampening water composition is supplied to the printing plate under the conditions that the surrounding members are rotated at high speed. As a result, high quality printed matters can be produced. The dampening water composition of the present invention can be used together with various kinds of inks. In particular, when the printing ink that cannot dry quickly, such as a soybean oil ink is employed, the dampening water composition of the present invention can improve the setting and drying properties of the ink. Moreover, the dampening water composition of the present invention exhibits excellent emulsification behavior in the printing operation, so that the dampening water composition can be used in a wide variety of printing presses, for example, a Dahlgren dampener and a commercially available dampening system "Alcolor" (trademark), made by Heidelberger Druckmaschinen AG, which are conventionally considered incompatible with the dampening system free of isopropyl alcohol. The dampening water composition of the present invention is stable during a long-term service, which can lead to improvement in productivity.

What is claimed is:

1. A dampening water composition for a lithographic printing plate comprising at least one compound represented by the following formula (I) and at least one compound represented by the following formula (II):

(I)

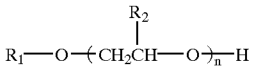

wherein $R^1$ represents an alkyl group having 3 to 6 carbon atoms, $R^2$ represents a methyl group or a hydrogen atom, and n is an integer ranging from 1 to 3;

(II)

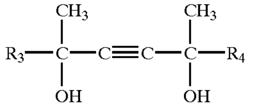

wherein $R^3$ and $R^4$ are each independently a methyl group, ethyl group, or isopropyl group.

2. The dampening water composition according to claim 1, wherein the compound of formula (I) is at least one selected from the group consisting of propylene glycol mono-n-propyl ether, propylene glycol mono-n-butyl ether, propylene glycol mono-t-butyl ether, and ethylene glycol mono-t-butyl ether.

3. The dampening water composition according to claim 1, wherein the compound of formula (I) is contained in an amount of 0.05 to 5.0% by weight and the compound of formula (II) is contained in an amount of 0.01 to 3.0% by weight, on the basis of the total weight of the dampening water composition.

4. The dampening water composition according to claim 1, wherein the compound of formula (I) is contained in an amount of 0.2 to 3.0% by weight and the compound of formula (II) is contained in an amount of 0.02 to 1.5% by weight, on the basis of the total weight of the dampening water composition.

5. The dampening water composition according to claim 1, wherein the amount ratio by weight of the compound of formula (I) to the compound of formula (II) is in a range of(1:1) to (20:1).

6. The dampening water composition according to claim 1, further comprising isopropyl alcohol in an amount of 0 to 5% by weight.

7. A lithographic printing process for producing printed matters using a soybean oil ink in combination with a dampening water composition comprising at least one compound represented by the following formula (I) and at least one compound represented by the following formula (II):

(I)

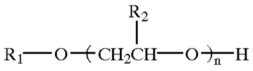

wherein $R^1$ represents an alkyl group having 3 to 6 carbon atoms, $R^2$ represents a methyl group or a hydrogen atom, and n is an integer ranging from 1 to 3;

(II)

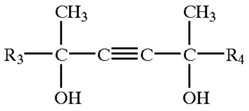

wherein $R^3$ and $R^4$ are each independently a methyl group, ethyl group, or isopropyl group.

8. The lithographic printing process according to claim 7, wherein the compound of formula (I) is at least one selected from the group consisting of propylene glycol mono-n-propyl ether, propylene glycol mono-n-butyl ether, propylene glycol mono-t-butyl ether, and ethylene glycol mono-t-butyl ether.

9. The lithographic printing process according to claim 7, wherein the compound of formula (I) is contained in an amount of 0.05 to 5.0% by weight and the compound of formula (II) is contained in an amount of 0.01 to 3.0% by weight, on the basis of the total weight of the dampening water composition.

10. The lithographic printing process according to claim 7, wherein the compound of formula (I) is contained in an amount of 0.2 to 3.0% by weight and the compound of formula (II) is contained in an amount of 0.02 to 1.5% by weight, on the basis of the total weight of the dampening water composition.

11. The lithographic printing process according to claim 7, wherein the amount ratio by weight of the compound of formula (I) to the compound of formula (II) is in a range of(1:1) to (20:1).

12. The lithographic printing process according to claim 7, wherein said dampening water composition further comprises isopropyl alcohol in an amount of 0 to 5% by weight.

* * * * *